United States Patent [19]

Spencer et al.

[11] 4,032,496

[45] June 28, 1977

[54] AQUEOUS COATING COMPOSITIONS CONTAINING A POLYLIGAND SOLUTION POLYMER

[75] Inventors: Frank Russell Spencer, Morris; Edwin Ralph Kolodny, Stamford, both of Conn.

[73] Assignee: American Cyanamid Company, Stamford, Conn.

[22] Filed: July 29, 1975

[21] Appl. No.: 600,178

[52] U.S. Cl. .................. 260/29.6 TA; 260/29.6 E; 260/29.6 M
[51] Int. Cl.² ........................................ C08L 33/02
[58] Field of Search ............... 260/29.6 TA, 29.6 E, 260/29.6 M

[56] References Cited

UNITED STATES PATENTS

| | | | |
|---|---|---|---|
| 3,007,877 | 11/1961 | Essig | 260/29.6 TA |
| 3,308,078 | 3/1967 | Rogers et al. | 260/27 |
| 3,440,188 | 4/1969 | Burdick et al. | 260/29.6 TA |
| 3,467,610 | 9/1969 | Fiarman et al. | 260/29.6 TA |
| 3,574,124 | 4/1971 | Lyness et al. | 260/29.6 M |

*Primary Examiner*—M. J. Welsh
*Attorney, Agent, or Firm*—Charles J. Fickey

[57] ABSTRACT

Aqueous compositions containing a polyligand solution polymer in which the ligand groups are carboxylic acid groups, saponified in part with ammonia and polyvalent metal ions which form complexes with ammonia.

5 Claims, No Drawings

AQUEOUS COATING COMPOSITIONS CONTAINING A POLYLIGAND SOLUTION POLYMER

This invention relates to aqueous coating compositions containing a polyligand solution polymer. More particularly, it relates to aqueous polyligand coatings in which the ligand groups are carboxylic acid groups, saponified in part with ammonia and polyvalent metal ions which form complexes with ammonia.

Aqueous coating compositions comprising a polyligand emulsion polymer are described in U.S. Pat. No. 3,308,078. The compositions are complex, comprising a resin cut containing an aqueous base and a polyligand alkali soluble resin, aqueous ammonia, a metal-fugitive ligand complex and a stabilizing agent. The compositions are described as having unique structural integrity, evidenced by their resistance to water, detergents, mild alkali and various organic materials, captive, non-degraded functional groups, controlled removability; and high gloss, hardness and durability.

It would be highly desirable to provide aqueous floor coating compositions which are simple in nature and provide the durable properties of resistance to detergents, alkalies and solvents; controlled removeability and high hardness and gloss.

It is therefore a major object of the present invention to provide a simple aqueous coating composition containing a polyligand solution polymer, without the necessity of forming complex blends of additives which are required to achieve properties in systems containing polyligand emulsion polymers.

The present invention is based on the discovery of an aqueous coating composition containing a low molecular weight polyligand solution polymer in a water soluble organic solvent which is saponified with ammonia, complexed with a metal fugitive ligand complexing agent and diluted with water.

The aqueous coating compositions of the invention exist as solutions of low molecular weight polyligands saponified in part with polyvalent metal ions which form complexes with ammonia, notably zinc. Such a polyligand dries to a water insoluble film when ammonia evaporates and becomes completely water-soluble when contacted with moist ammonia or ammonium hydroxide.

The polyligand of the invention is a polymer containing carboxyl groups obtained by copolymerization of a vinyl monomer such as methacrylic acid, acrylic acid or maleic anhydride with methyl methacrylate and an acrylic acid ester, such as ethyl acrylate, butylacrylate, n-octylacrylate, 2-ethylhexylacrylate, and the like, by free radical catalysis. The preferred polyligand comprises 10–15% methacrylic acid, 60–70% methylmethacrylate and 20–25% butylacrylate.

The polyligand is prepared in a water soluble organic solvent having a boiling point of 150° C. or higher. Such solvents include dipropylene glycol monomethyl ether, which is preferred, and Carbitol (monoethyl ether of diethylene glycol), and ethyl Cellosolve. The solvent comprises 30–40% by weight of the polymer solution.

Generally the lower the molecular weight of the polymer, as determined by intrinsic viscosity, the higher the gloss of the ultimate film when the coating composition is applied to a substrate like vinyl tile. The molecular weight is inversely proportional to the boiling point of the solvent, i.e., the higher the boiling point of the solvent the lower the molecular weight. The intrinsic viscosity range for the polymers of this invention is 0.06 to <0.2, preferably 0.6–0.1, in contrast to polyligand emulsion polymers which have intrinsic viscosities of about 0.2 to 1.0 or higher. Thus, the organic solvent is selected by matching the solubility parameters with the polymer, adjusting polymerization conditions to allow for the boiling point of the solvent and further limiting the solvent according to the contemplated use, i.e., if the solvent is to be fugitive, as in a coating which hardens by evaporation, the evaporation rate must be high, or if the solvent is to serve as a permanent plasticizer, the evaporation rate must be low. One of the distinctive features of the present invention is that the polymer system eliminates or reduces the need for a plasticizer, although the addition of a plasticizer improves the gloss and leveling properties of the coating and is therefore preferably added.

The polyligand is saponified, at least in part, with ammonia, and a metal cation yielding a soluble product. It is preferred to use a metal cation which complexes with ammonia and which, in the absence of ammonia, is sufficiently polyvalent to form a water resistant film. The preferred metal fugitive ligand complexing agent is zinc ammonium carbonate, consisting of a zinc cation, a fugitive ligand (ammonia) and a carbonate anion. Other suitable metal fugitive ligand complexing agents include zinc ammonium acetate and formate.

The amount of ammonia used in saponifying the polyligand is an amount sufficient to provide a ratio of $NH_4^+/CO_2^-$ of from about 0.5 to 1 or more, preferably at least 1. The zinc content on nonvolatile components is from 0.17–1.65%, preferably 0.5–1.0%.

The polyligand polymer, prepared in solution at 60–70% solids, is ordinarily cooled down to a temperature in the range of 90°–95° C. and neutralized with ammonia, generally as a dilute (~5%) solution. Then it is further treated with zinc ammonium carbonate (usually a 5–6% aqueous solution) to a total zinc content in the range described above. Water is finally added to a solids content in the range 10–20%. The pH of the solution should be at least 9.

This solution is then formulated with a plasticizer, optional, but preferred, and a surfactant. The preferred plasticizer is tris(butoxyethyl)phosphate. The surfactant, which is added to improve wettability on tile, is preferably a fluorocarbon anionic surfactant, such as FC 128, sold by 3M Company. The surfactant is normally used in an amount of from about 0.005%–0.1%, preferably 0.01%. The composition is adjusted to about 10–15% solids by adding water. The solvent comprises 5–10% of the final coating, preferably 6–6.5%.

The invention is more completely illustrated by the examples which follow.

EXAMPLE 1

A. 215 Grams of dipropylene glycol monomethyl ether was heated to reflux (145°–150° C.) under a nitrogen blanket. A mixture of 100 grams of butylacrylate
340 grams methylmethacrylate
60 grams of methacrylic acid
10 grams n-dodecylmercaptan
10 grams di-tert.butylperoxide was added thereto over a period of about 2 hours and heated for an additional hour at 145°–150° C.

B. 100 Grams of A, containing 68% solids, was cooled to 90°–95° C. and neutralized with 32 grams of a 5% ammonia solution. The temperature was then reduced to 65°–70° C. and 7.5 grams of a 5.8% solution of zinc ammonium carbonate added to a total zinc ammonium carbonate added to a total zinc content of 0.64%, based on polymer solids. Water was then added to give a 25% solution, pH ~9.2.

EXAMPLE 2

The following formulations of floor polish were prepared using the 25% polymer solution of Example 1 B. (See Table 1).

Table I

| | Parts by Weight | | |
|---|---|---|---|
| | A | B | C |
| Example 1 B | 30 | 30 | 30 |
| Deionized water | 18 | 17.5 | 17 |
| Plasticizer (1) | 1 | 1.5 | 2 |
| Surfactant (2) (1% soln.) | 1 | 1 | 1 |
| pH | 9.0(25° C) | 8.9(34° C) | 9.0(30° C) |

(1) tris(butoxyethyl)phosphate
(2) FC 128, anionic fluorocarbon surfactant, Mining and Manufacturing Company, Minnesota
Note: All compositions contain 15% solids.

The compositions were coated on abraded 12 inch × 12 inch Kentile Black Vinyl tile and compared with a commercial product. Formica Floorshine (Composition D). The following observations were made. (See Table II).

Table II

| | A | | B | | C | | D | |
|---|---|---|---|---|---|---|---|---|
| Coat | I | II | I | II | I | II | I | II |
| Visual Gloss | G | VGE | GVG | VG | VG | E | F | VG |
| Leveling | G | GVG | G | GVG | G+ | E | G | E |

F = fair
GVG = good - very good
G = good
VGE = very good - excellent
VG = very good
E = excellent

EXAMPLE 3

A. 100 Grams of the 68% solids polymer composition of Example 1 A was reacted with 32 grams of 5% aqueous ammonia and diluted with 139.6 grams deionized water.

B. 29.86 Grams of the above ammonical solution was reacted at 70° C. with 0.32 gram of a 5.8% solution of zinc ammonium carbonate. Some cloudiness formed which disappeared when 0.2 ml. conc. aqueous ammonia was added. The temperature was lowered to about 45° C. and 0.5 gram tris(butoxyethyl) phosphate and 0.75 gram of FC 128 anionic fluorocarbon surfactant added. Finally the mixture was diluted with 18.37 grams water to give a 25% solution containing 0.25% zinc on the polymer solids.

EXAMPLE 4

10 Grams of the solution of Example 1 A was reacted at 70° C. with 3.2 grams of a 5% aqueous ammonia solution and 0.29 gram of a 5.8% solution of zinc ammonium carbonate. The temperature was reduced to 45°–50° C. and a 1% solution of FC128 surfactant and 0.68 gram of tris(butoxyethyl)phosphate added. Finally, the solution was diluted with 30.86 ml. water to a 25% solution containing 0.25% zinc on polymer solids.

EXAMPLE 5

10 Grams of the polymer solution of Example 1 A was heated to 70° C and reacted with 4.2 grams 5% aqueous ammonia, 0.89 gram 5.8% solution of zinc ammonium carbonate, 0.46 gram of a 1% solution FC128 surfactant and 0.69 gram of tris(butoxyethyl)phosphate. Finally, the solution was diluted with 29.69 ml. water at 45° C. to give a 25% solution containing 0.75% zinc on polymer solids.

EXAMPLE 6

The floor polish formulations of Examples 3 B, 4 and 5 were coated on 12 inch × 12 inch abraded Kentile Black Vinyl tiles. The gloss was observed visually and using a 60° Gardner Glossmeter. The following observations were made. (See Table III).

Table III

| | Visual Gloss | | Leveling | 60° Gloss |
|---|---|---|---|---|
| | I | II | I | of Coat 1 |
| Example 3 B | VG | E | VG | 70 |
| Example 4 | VG | VG-E | G | 64 |
| Example 5 | G-VG | VG-E | VG | 62 |
| Formica Floor Shine | G | VG | VG | 48 |

What is claimed is:

1. A coating composition comprising water and from about 10–20 weight percent of (a) a polyligand polymer, prepared by free radical polymerization in solution in a water soluble organic solvent having a boiling point of at least 150° C., of from about 10–15% by weight of methacrylic acid, 60–70% by weight of methyl methacrylate and 20–25% by weight of butyl acrylate, said polymer having an intrinsic viscosity in the range of 0.06 to <0.2 and saponified, at least in part, with (b) aqueous ammonia in an amount sufficient to provide at least an equivalent of ammonia per carboxyl group in said polymer ($NH_4^+/COO^-$) of at least 1% and (c) a metal fugitive complexing agent capable of undergoing ligand transfer with carboxyl groups in the polymer, selected from zinc ammonium formate, acetate and carbonate, in an amount sufficient to provide a zinc content based on solids content of from about 0.17 to 1.65%.

2. The composition of claim 1 wherein there is additionally present a plasticizer compatible with said polymer, and a fluorocarbon anionic surfactant.

3. The composition of claim 2 wherein said plasticizer is tris(butoxyethyl)phosphate.

4. The composition of claim 1 wherein said water soluble organic solvent is dipropylene glycol monomethyl ether.

5. The composition of claim 1 wherein said metal-fugitive complexing agent is zinc ammonium carbonate.

* * * * *